United States Patent

[11] 3,576,569

[72] Inventor Robert E. Watson
Loveland, Colo.
[21] Appl. No. 764,411
[22] Filed Oct. 2, 1968
[45] Patented Apr. 27, 1971
[73] Assignee Hewlett-Packard Company
Palo Alto, Calif.

[54] PLURAL MATRIX KEYBOARD WITH ELECTRICAL INTERLOCK CIRCUIT
6 Claims, 1 Drawing Fig.

[52] U.S. Cl. .... 340/166, 340/147, 340/365
[51] Int. Cl. .... H04g 3/00
[50] Field of Search .... 340/147 (FLP), 166, 365

[56] References Cited
UNITED STATES PATENTS 2,810,903 10/1957 Lee .... 340/365X
3,187,321 6/1965 Kameny .... 340/365X
3,219,927 11/1965 Topp .... 340/365X
3,293,640 12/1966 Chalfin .... 340/365
3,483,553 12/1969 Blankenbaker .... 340/365

*Primary Examiner*—Harold I. Pitts
*Attorney*—Stephen P. Fox

ABSTRACT: The key switches of a keyboard are connected between the row and column conductors in a switching matrix. Each key when operated generates a unique six-bit binary code. The three most significant bits are produced by a diode encoding matrix formed with the column conductors, and the three least significant bits are produced by a diode encoding matrix formed with the row conductors. A voltage developed across a resistor in the keyboard voltage supply circuit produces a "key down" signal whenever a single key is operated. An electrical interlock circuit threshold detects the voltage across the resistor and inhibits the "key down" signal when two or more keys are operated simultaneously.

PATENTED APR 27 1971 3,576,569
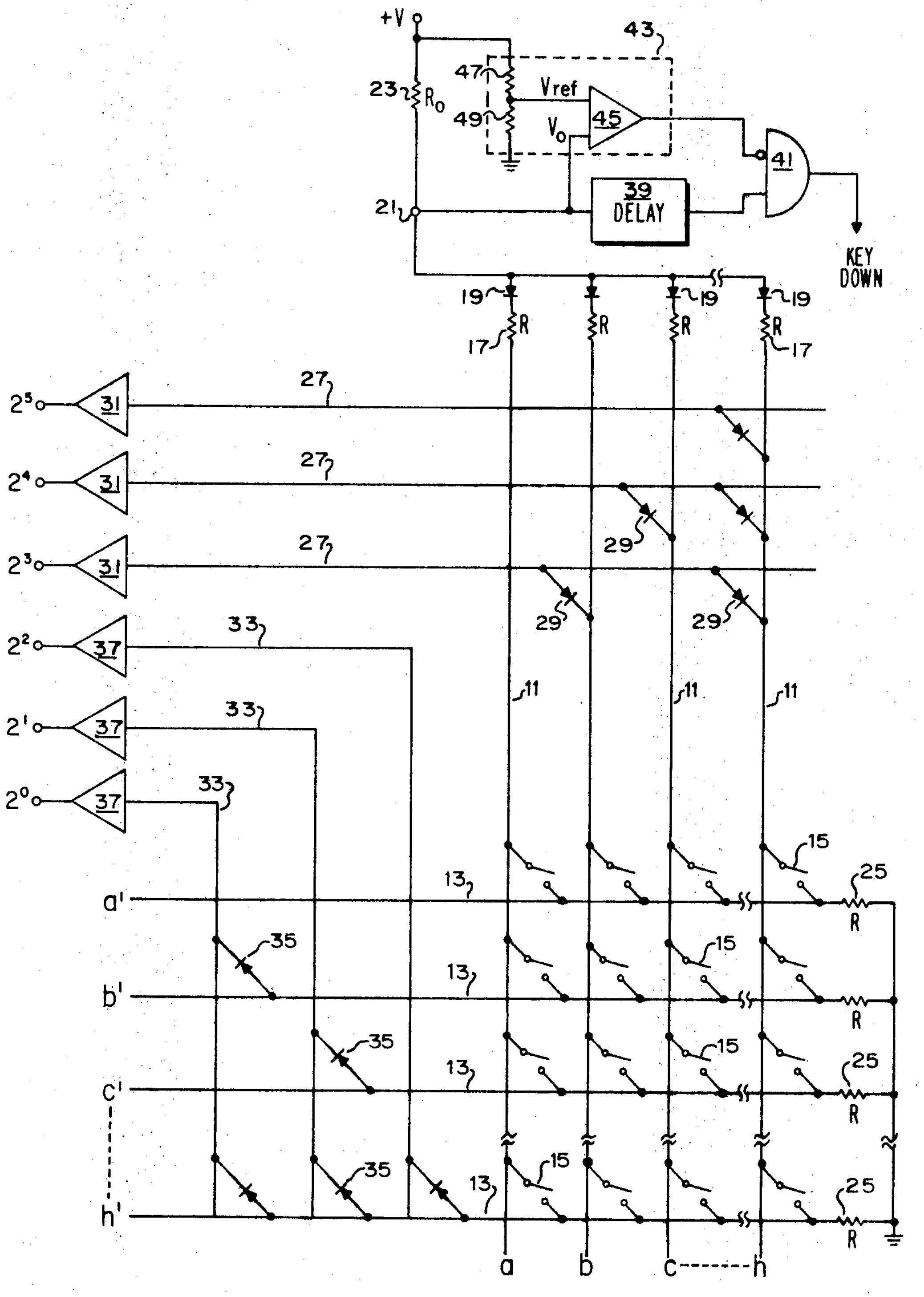
INVENTOR.
ROBERT E. WATSON
BY Stephen P. Fox
AGENT

PLURAL MATRIX KEYBOARD WITH ELECTRICAL INTERLOCK CIRCUIT

BACKGROUND OF THE INVENTION

In a data processing system, one method of entering data to be processed is by a keyboard arrangement wherein each key generates a unique multilevel binary code. It is desirable that the binary encoding circuitry for the keyboard be of a simplified configuration and utilize a minimum number of components. It is also desirable that a special signal be produced each time that a single key is depressed for conditioning the logic circuitry in the data processing system to respond to the binary code generated thereby. Preferably, the conditioning signal should not be produced when two or more keys are depressed simultaneously because in this instance the combined binary codes generated by the keys are likely to be an improper representation of the data to be processed.

SUMMARY OF THE INVENTION

In the illustrated embodiment of the invention, there is provided a plurality of keyboard switches which are operable to electrically interconnect different row and column conductors in a switching matrix. Each key, when operated, allows a current flow in one of the column conductors and one of the row conductors. The column conductors are connected in circuit with a first diode matrix encoding means which produces a number of binary signals, for example, the high order or most significant bits of a multilevel binary code. The row conductors are connected in circuit with a second diode matrix encoding means for producing a number of binary signals which are different from those generated by the first encoding means, for example, the low order or least significant bits of the binary code. The binary signal outputs from both of the encoding means provide a unique code representation for each key of the keyboard.

A feature of the invention is the provision of circuitry for generating a "key down" signal when only one key is operated, to condition the data processing logic circuitry for receiving the binary code corresponding to the operated key. The "key down" signal is delayed for a predetermined time interval to block spurious code signals due to bouncing of the key switch contacts, and thus to ensure that the proper binary code is established by the key before the data processing logic circuitry can respond thereto.

The invention also features electrical interlock circuitry for inhibiting the "key down" signal when two or more keys are simultaneously operated. The interlock circuitry includes an inhibit gate and a threshold detector, the latter of which is responsive to a voltage signal developed across a resistor in the current supply path for the key switching matrix. When the voltage across the resistor is greater than a predetermined reference voltage, corresponding to the simultaneous operation of two or more keys, the threshold detector drives the inhibit gate which blocks the "key down" signal. The absence of a "key down" signal prevents the data processing circuitry from responding to an improper key code.

BRIEF DESCRIPTION OF THE DRAWING

The single FIGURE is a combined schematic and block diagram illustrating the preferred embodiment of the invention.

DESCRIPTION OF THE PREFERRED EMBODIMENT

Referring now to the FIGURE, there is shown a switching matrix formed by eight column conductors 11, designated respectively by the letters *a*, *b*, *c* ... *h*, and eight row conductors 13, designated respectively by the letters *a'*, *b'*, *c'* ... *h'*. The row and column conductors are interconnected by 64 selectively operable key switches 15 which are arranged to form a keyboard of the type used to enter data and instructions into a data processing system.

Each of the column conductors 11 is connected through a resistor 17 and an isolating diode 19 to a common terminal 21, and thence through an input resistor 23 to a source of positive voltage +V. Also, each row conductor 13 is connected through a resistor 25 to a ground potential having a polarity opposite to that of the positive voltage source +V. Each of the column and row resistors 17, 25 has a value R and the input resistor 23 has a value $R_o$. The values R and $R_o$ are mathematically related to one another as described hereinafter.

A first encoding matrix is formed with the column conductors 11. This matrix includes three output lines 27 each of which is connected to predetermined ones of the column conductors by a number of diodes 29. The lines 27 are connected to signal amplifiers 31, the outputs of which produce binary signals representative of different bits of a binary code. A second encoding matrix is formed with the row conductors 13 in a manner similar to that of the first encoding matrix. Specifically, there are provided three output lines 33 connected to different combinations of the row conductors 13 by diodes 35, and each of the lines 33 drives a signal amplifier 37 which produces a binary output.

When none of the key switches 15 is operated, the voltage levels established on the column and row conductors 11, 13 maintain the column diodes 29 and the row diodes 35 reverse-biased so that all of the column and row signal amplifiers 31, 37 will produce the same binary output (for example a 0 output, assuming that positive logic is used). When any one of the key switches 15 is operated, a current flows through the particular column conductor and row conductor connected thereto. The resulting voltage drops in the associated column and row resistors 17, 25 forward bias the particular encoding matrix diodes 29, 35 which are connected to the energized column conductor and row conductor. There is produced a unique six-bit binary code which defines the particular key switch operated. As shown in the FIGURE, the low order or least significant bits of this code, i.e. those with the weightings $2^0$, $2^1$ and $2^2$ are produced by the row encoding matrix amplifiers 31, whereas the high order or most significant bits having the weightings $2^3$, $2^4$ and $2^5$ are produced by the column encoding matrix amplifiers 37.

Each time a key switch 15 is depressed, the current through the associated column and row conductor causes a voltage drop across resistor 23. This voltage signal appears at common terminal 21 and is applied to a delay circuit 39 and thence through an inhibit gate 41 to a "key down" output which indicates when a key switch is operated. The delay interval of circuit 39 provides the settling time for the particular key switches used. If mechanical key switches are used the delay may be on the order of ten milliseconds, for example, to allow for contact bounce. Thus the "key down" signal is not generated until after the proper binary code levels on output lines 27, 33 of the two encoding matrices are steady signals devoid of switching transients. The "key down" output may be used as an enabling signal to drive additional data processing logic circuitry, not shown.

When two or more of the key switches 15 are simultaneously depressed, the six-bit binary code produced by the column and row encoding matrices is the logical AND of the individual keys and is likely to be an improper representation of any of the keys depressed. In this instance the "key down" signal is inhibited by an output from a threshold detector which is applied to the inhibit gate 41 so that the data processing system will not respond to an improper keyboard code. In effect, the inhibit gate 41 and the threshold detector 43 form an electrical interlock circuit which produces a "key down" signal when one of the key switches 15 is operated, and inhibits this signal when two or more of the key switches are operated simultaneously during the delay period provided by delay circuit 39.

The threshold detector circuit 43 includes a differential amplifier 45 for comparing the magnitude $V_o$ of the voltage signal at common terminal 21 with a reference voltage $V_{ref}$ which is produced by a voltage divider formed by two resistors 47, 49. The voltage $V_o$ corresponds to the voltage drop across resistor 23. When a single one of the key switches 15 is depressed, the voltage $V_o$ has a certain value depending on the current flow through the combination of resistor 23, one of the column resistors 17 and one of the row resistors 25. However, when two or more keys are simultaneously depressed, there will be current paths through two or more column and/or row conductors so that the magnitude of $V_o$ will be greater than that for a single key depression. The reference voltage $V_{ref}$ is adjusted to be greater than $V_o$ when one key is operated, and less than $V_o$ when two or more keys are operated at the same time. The differential amplifier 45 produces an output which inhibits conduction of gate 41 whenever the voltage $V_o$ at common terminal 21 is greater than the reference voltage $V_{ref}$.

It can be shown, assuming diodes 19 to be ideal diodes, that the maximum difference between $V_o$ for operation of one key and $V_o$ for operation of two keys occurs when the value $R_o$ of resistor 23 is related to the value R of each of the column and row resistors 17, 25 by the equation $R_o = 3R$. In this case, the change in $V_o$ is expressed by the equation $\Delta V_o = 0.072v$, where V is the supply voltage.

I claim:

1. A keyboard circuit for a digital data processing system comprising:
   - switching matrix means including:
     - a plurality of column conductors;
     - a plurality of row conductors;
     - a plurality of keyboard switches respectively selectively interconnecting said column conductors and said row conductors;
   - asymmetrically conducting means for electrically isolating the combinations of interconnectable column and row conductors from one another;
   - first and second encoding matrix means responsive to actuation of said switches for respectively producing signals corresponding to first and second groups of bits in a binary code;
   - said first encoding matrix means being associated with said column conductors and including:
     - a plurality of binary output means associated respectively with different bits in said first group of bits; and
     - a plurality of asymmetrically conducting means for connecting each of said binary output means to a predetermined combination of said column conductors;
   - said second encoding matrix means being associated with said row conductors and including:
     - a plurality of binary output means associated respectively with different bits in said second group of bits; and
     - a plurality of asymmetrically conducting means for connecting each of said last-named binary output means to a predetermined combination of said row conductors;
   - resistance means for connecting each of said row conductors to a voltage source of one polarity;
   - a common terminal;
   - resistance means for connecting each of said column conductors to said common terminal; and
   - input resistance means for connecting said common terminal to a voltage source having a polarity opposite to said one polarity.

2. The keyboard circuit of claim 1, further including electrical interlock means responsive to the signal at said common terminal for providing an output signal when one of said key switches is operated and for inhibiting said output signal when two or more of said key switches are simultaneously operated, said electrical interlock means including:
   - threshold detector means for producing an inhibit signal in response to a predetermined voltage level at said common terminal; and
   - means for gating the signal at said common terminal, said gating means having an inhibit input responsive to the inhibit signal from said threshold detector means.

3. The keyboard circuit of claim 2, said threshold detector means including:
   - a source of reference voltage having a magnitude intermediate the two voltage levels at said common terminal which correspond to operation of one key switch and two key switches, respectively; and
   - differential amplifier means for producing said inhibit signal when the voltage at said common terminal is greater than said reference voltage.

4. The keyboard circuit of claim 2, further including means connected between said common terminal and said gating means for delaying the signal at said common terminal for a predetermined time interval.

5. The keyboard circuit of claim 1, said binary output means of said first and second encoding matrix means each including a signal amplifier.

6. The keyboard circuit of claim 1, said asymmetrically conducting means for electrically isolating the combinations of interconnectable column and row conductors including a diode connected in series with each of said plurality of column conductors.

UNITED STATES PATENT OFFICE
CERTIFICATE OF CORRECTION

Patent No. 3,576,569 Dated April 27, 1971

Inventor(s) Robert E. Watson

It is certified that error appears in the above-identified patent and that said Letters Patent are hereby corrected as shown below:

Column 3, line 17, "equation $R_o = 3\ R$" should read -- equation $R_o = \sqrt{3\ R}$ --.

Signed and sealed this 7th day of September 1971.

(SEAL)
Attest:

EDWARD M.FLETCHER,JR.
Attesting Officer

ROBERT GOTTSCHALK
Acting Commissioner of Pa